(12) United States Patent
Hoffland (10) Patent No.: US 6,630,072 B2
(45) Date of Patent: Oct. 7, 2003

(54) METHODS AND APPARATUSES FOR TREATING WASTE WATER

(75) Inventor: Robert O. Hoffland, Conroe, TX (US)

(73) Assignee: Hoffland Environmental, Inc., Conroe, TX (US)

( * ) Notice: Subject to any disclaimer, the term of this patent is extended or adjusted under 35 U.S.C. 154(b) by 0 days.

(21) Appl. No.: 09/789,265

(22) Filed: Feb. 20, 2001

(65) Prior Publication Data

US 2002/0113012 A1 Aug. 22, 2002

(51) Int. Cl.[7] .............................. C02F 1/52; B01D 36/04
(52) U.S. Cl. ..................... 210/620; 210/710; 210/713; 210/804; 210/195.3; 210/197; 210/202; 210/806
(58) Field of Search ................................ 210/620, 621, 210/622, 617, 804, 806, 195.1, 196, 151, 202, 209, 259, 262, 702, 710, 713, 749, 195.3, 197, 631, 623

(56) References Cited

U.S. PATENT DOCUMENTS

| | | | |
|---|---|---|---|
| 3,377,272 A | * | 4/1968 | Cann ........................ 210/804 |
| 3,570,670 A | * | 3/1971 | Endo ........................ 210/262 |
| 4,501,665 A | * | 2/1985 | Wilhelmson ................ 210/151 |
| 4,855,065 A | * | 8/1989 | Keeter et al. ............... 210/804 |
| 5,078,882 A | * | 1/1992 | Northrop .................... 210/622 |
| 5,167,829 A | * | 12/1992 | Diamond et al. ........... 210/804 |
| 5,453,202 A | * | 9/1995 | Marchesi .................... 210/806 |
| 5,824,222 A | * | 10/1998 | Keyser et al. .............. 210/806 |
| 6,033,570 A | * | 3/2000 | Grisé ......................... 210/806 |
| 6,039,874 A | * | 3/2000 | Teran et al. ................ 210/202 |

OTHER PUBLICATIONS

Eckenfelder "Principles of Water Quality Management" p. 131, 1980.*

* cited by examiner

Primary Examiner—Christopher Upton
(74) Attorney, Agent, or Firm—The Matthews Firm (57) ABSTRACT

Novel methods and apparatuses are disclosed for the treatment of wastewater to reduce often associated offensive odors by promoting aerobic conditions through decreasing the amount of oxygen required to maintain aerobic cultures and/or aerobic biological activity in the wastewater.

14 Claims, 10 Drawing Sheets

METHODS AND APPARATUSES FOR TREATING WASTE WATER

FIELD OF INVENTION

This invention generally relates to apparatuses and methods for treating water and other fluids, including, but not limited to, agricultural and industrial waste water, utilizing a combination of screening and a benign, naturally occurring, biological processes to eliminate and cut the production of, often associated, offensive odors.

BACKGROUND OF INVENTION

For purposes of this patent, the following terms are defined. As used herein, the term "conveyed" or "convey" means and refers to any system or process for directing, channeling, sending, spraying, blowing, moving, funneling, pouring, pumping wastewater or other solid or at partially liquid material. As used herein, the term "tank" means and refers to a bin(s), pond(s), container, area, and the like. As used herein, the term "trolley" means and refers to a bin, tank, collection site, collection vehicle, area, pile, and the like. As used herein, the term "pass," "passing," "passed," and other conjugations means and refers to convey, to direct and/or to transport via any method or structure common in the art such as pipe, funnel, trough, line, slope, gully, trench, river, stream, and the like. As used herein, the term "lagoon" means and refers to a lagoon, pond, lake, stream, retention structure, facultative pond and the like.

When wild hogs roamed the forest in sparse numbers with the population determined by the available food sources, the environmental impact of the hog excretion was insignificant. The individual animal roamed freely, spreading his waste over large areas as he traveled. Later, when man domesticated hog and other livestock, and increased the local concentration to correspond to the caretakers food production, the environmental impact of waste was at first minimal. The farmer removed the waste manure from the pig-sty and spread it over his farm for fertilizer. In recent times, however, livestock production density has dramatically increased. For example, the specialty hog production operators purchased their hog feed (cereal grains) from other farmers who specialized in the production of grain cereal. This enables one operator to have the hog production facility of 10,000 head of hogs or more. The production of hog manure now becomes a problem. The spreading of large quantities of hog manure on land requires an extensive amount of land. The soil has a finite capacity to degrade animal feces, and when exceeded it becomes the equivalent of a pile of manure. The waste is often accumulated and dispersed over the cropland at specific times of the year. However, there are physical limitations on the distribution of the waste because it cannot be practically applied to near mature crops without the destruction of the crop. Also it cannot be applied when the waste may run off the soil because the soil is saturated or frozen. In fact, several states within the U.S. have created regulations prohibiting land application during the winter months.

In addition to the practical limits of the distribution of animal feces, regulatory agencies have applied limits on the amount of feces that may be spread. The regulations limit the amount of animal feces per acre to be about equivalent to the plant uptake of the non-biodegradable components. These regulations were created to prohibit the surface run-off from storm water and the excess percolation of the soluble waste components into the ground water.

In recent times, livestock producers have elected to create pits or lagoons for the collection of the waste. In the barns or houses, the animals live on elevated flooring which permits the feces to drop through the floor to a sub-floor. This sub-floor is periodically flushed to remove the feces and maintain a healthy living environment. The feces, with the wash down water as a vehicle, flow to the storage lagoon. The water utilized to flush the livestock production floor and move the freshly produced feces to the lagoon is usually recycled supernatant from the storage lagoon. Recycling the wastewater provides two advantages to the producer. First, it reduces that amount of fresh water that must be provided and secondly, since it is recycled from the storage lagoon, the size of the storage facility can be significantly reduced.

The problem with the recycled water is that it contains high levels of ammonia (breakdown product of the waste urea) and odors, which are not beneficial to the health of the livestock. High levels of ammonia in the flush water require the building to be vented to reduce the ambient levels of ammonia. Increased ventilation lowers the ambient temperatures in the winter. The lower temperatures lower the rate of weight gain of the animals and increases the food requirement of the animal to maintain body temperature.

Biological cultures purify water by exploiting the metabolic processes of various bacterial and algal species to convert organic and inorganic waste products into benign end products, typically carbon dioxide and a reproduction of the species. However, intermediate products formed by biological processes can include methane and sulfur containing gases, volatile organic acids or other volatile or odiferous products, depending on the nature of the culture, the waste being digested and the ambient environment.

Biological cultures can be fostered of desirable microorganisms, which provide the functional basis for the wastewater treatment by metabolically converting the waste products. However, cultures of undesirable microorganisms which produce undesirable tastes, odors, growths, or which are actually toxic are also possible. Therefore, it is important in biological wastewater treatment that cultures of suitable microorganisms are fostered and the undesirable cultures avoided.

The organic material in the wastewater serves both as an energy source and a source of carbon for cell synthesis by the microorganisms of the culture. Microorganisms are both reactants and products in the biological treatment of wastewater. Typical configurations of biological reactor cultures for purifying water include suspended culture processes and attached growth systems such as fixed-film reactors. Suspended cultures include activated sludge (flocculent cultures), aerated lagoons, oxidation ponds, and anaerobic cultures.

The oxygen level present in the culture material affects biological digestion of organic waste material because the oxygen level determines the metabolic pathway available to the microorganism. Aerobic conditions provide plenty of oxygen to the culture, and foster the growth of microorganisms that can use the exogenous oxygen as a terminal electron acceptor in the oxidation of organic acids generated form the metabolic breakdown of organic material, i.e. aerobic biological activity. If insufficient exogenous oxygen is available to the culture, the conditions are anaerobic. Under anaerobic conditions, the absence of oxygen as a terminal electron acceptor results in the excretion of organic acids into the culture medium as waste.

Farmers often create storage lagoons on their farms to accumulate and store the flushed wastewater, feces and urine until an appropriate time to distribute the wastes over the land. The surface water is utilized as flush water not only to reduce the amount of water consumed by the animal production, but also to conserve the capacity of the lagoon. Using the lagoon water for flushing reduces the water consumption by 70–90% and proportionally reduces the required size of the lagoon. The wastewater is usually stored until planting time and applied to cropland in place of a commercial fertilizer.

Currently, during the storage process, due to the large volume of animal waste entering the lagoon, there is insufficient oxygen present to support the growth of aerobic cultures and/or aerobic biological activity. In the absence of the desired oxygen, the microbial growth in the lagoon converts to anaerobic activity. This anaerobic activity leads to what is commonly known as a "septic" lagoon. In a septic lagoon a very foul odor is present from the production of hydrogen sulfide, organic-sulfide compounds, organic acids, and etc. When the accumulated waste liquid is distributed over the cropland by spray irrigation, the foul smelling volatile gases are liberated, producing a very undesirable environment.

Aeration equipment can be installed to provide sufficient dissolved oxygen to maintain an aerobic culture. However, the energy cost to operate the aerobic treatment is very cost prohibitive. There are several methods of aeration available. Surface aerators are commonly used in large open areas. The surface aerator consists of an electric motor driven impeller suspended in the throat of a venturi with the entire unit mounted on a float to suspend the impeller just below the surface. As the impeller spins, it pumps the water up forming a large circular spray. Oxygen is dissolved in the water as it falls through the air. The amount of water spray and subsequently the amount of oxygen dissolved is directly proportioned to the amount of water pumped and therefore the horsepower of the motor and energy consumed.

Another commonly used method to increase the dissolved oxygen content of the lagoon is to blow air thorough an aeration system located on the bottom of the pond. The air is forced through a device with small openings to create small bubbles. As the bubbles rise through the liquid, oxygen is dissolved in the water. Again the amount of oxygen dissolved is directly proportional to the amount of air forced into the basin and therefore the horsepower utilized and energy consumed.

With these methods, it is possible to provide enough energy to supply sufficient oxygen to maintain an aerobic culture, but such methods are not entirely practical. The average waste generated by swine production is 3.1 pounds of BOD and 8.4 pounds of COD per day per 1000 pounds of live stock. This amount would be very cost prohibitive with the prior art methods.

Other methods that have developed in thart concentrate on screening the undissolved particles from the waste water prior to flushing. Typically, the flush water will consist of both dissolved ingredients and suspended undissolved solids or particles (undissolved ingredients). These undissolved particles are of varying size from sub-micron to much larger visible particles.

There are a variety of screen separators being used in the art field for such screening. However, the screens only remove about 15–20% of the organic mass. These large particles that can be screened are insignificant in the treatment process because removing only 20% of the organic mass will only reduce the energy consumption by 20%. Various types of screen—gravity inclined screen, inclined screens with roll compactor, rotating screens, screens with drag chains, have been utilized with either wedge wire construction or perforated metal construction and types produce essentially the same results in that most of the particles are too small to be removed by screen-separating devices. In any case, the majority of the fecal matter is unscreened and left to produce the foul smell and septic environment as heretofore described.

The foul odors of waste water become apparent in most operations, including, but not limited to:
    (a) When the stored water is returned to the barns as flush water, odors are liberated;
    (b) Spray operations: when the wastewater is applied to the cropland by spray irrigation (most common method), the liquid is pumped under high pressure through a nozzle and sprayed over large area. The spray area as well as all areas downwind has a putrid odor and is very undesirable;
    (c) Winter thermal changeover: In the winter to spring of the year, the normal thermo dine of the lagoon is disturbed. Due to the temperature differences the bottom layers roll to the surface, creating an extra heavy liberation of noxious odors; and,
    (d) the like.

Over the past few decades, more people have found it desirable to live in a country atmosphere rather then the conventional city life resulting in a greater number of people living near agricultural centers. The foul odor emanating from the anaerobic lagoons and spray fields has increasingly become a major area environmental issue. For example, the state of North Carolina has recently passed a moratorium prohibiting the creation of any new anaerobic lagoons. In fact, new rules are being created to phase out the use of all anaerobic lagoons because of the environmental and social problems. Other areas have proposed methods for the treatment of agricultural wastewater using biological techniques, the problem of odor and the economical removal of the source of the odor has not been addressed.

A few relevant prior art patents are as follows:

U.S. Pat. No. 5,545,325 discloses a facility for combined aerobic and anaerobic treatment of livestock wastewater disclosure. This is accomplished with a natural solid-liquid separation device comprising a digester with an automatic skimmer installed at the upper part of the digester, and a level sensing control valve to control the volume of wastewater in the digester;

U.S. Pat. No. 5,480,548 discloses a wastewater purification process is disclosed including directing the wastewater through at least one aerobic zone and at least one anaerobic zone in repeating or alternating segments. A portion of effluent from the one or more anoxic zones are fed through at least one aerobic zone to which wastewater is fed and returned to the upstream portion of the anoxic zone;

U.S. Pat. No. 5,472,472 discloses a process for the bioconversion of soluble and suspended organics from animal waste wherein the wastewater is treated through a series of ecoreactors and bioreactors, including aerobic and anaerobic treatment. Soluble phosphorus is precipitated with metallic salts;

U.S. Pat. No. 4,824,563 discloses a method of treating high concentration organic wastewater in dependence upon microorganisms. The method includes an anaerobic operation tank, an aerobic tank and an ozone treatment tank;

U.S. Pat. No. 4,999,111 discloses a process for treating wastewater including aerobic, anaerobic, and anoxic treatment. The process of the '111 patent includes splitting the stream of wastewater into a main stream and a side stream wherein the anoxic treatment takes place in the side stream. Activated sludge is generated in the side stream and is recycled to the mainstream treatment process that includes at least one aerobic treatment zone.

SUMMARY OF THE INVENTION

The present invention generally relates to processes and apparatuses for treatment of waste water.

This summary is not intended to be a limitation with respect to the features of the invention as claimed and any examples are merely intended as embodiments, and the scope and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. The terms "upstream" and "downstream" are intended to describe the connected relationship of the wastewater treatment modalities of the present invention, and are not intended to imply altitudinal or transformational relationship of the treatment modalities or the wastewater therein. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

Various embodiments of the present invention address problems associated with odors associated with the treatment of wastewater through reduction of solid and dissolved waste material.

Figure 1:
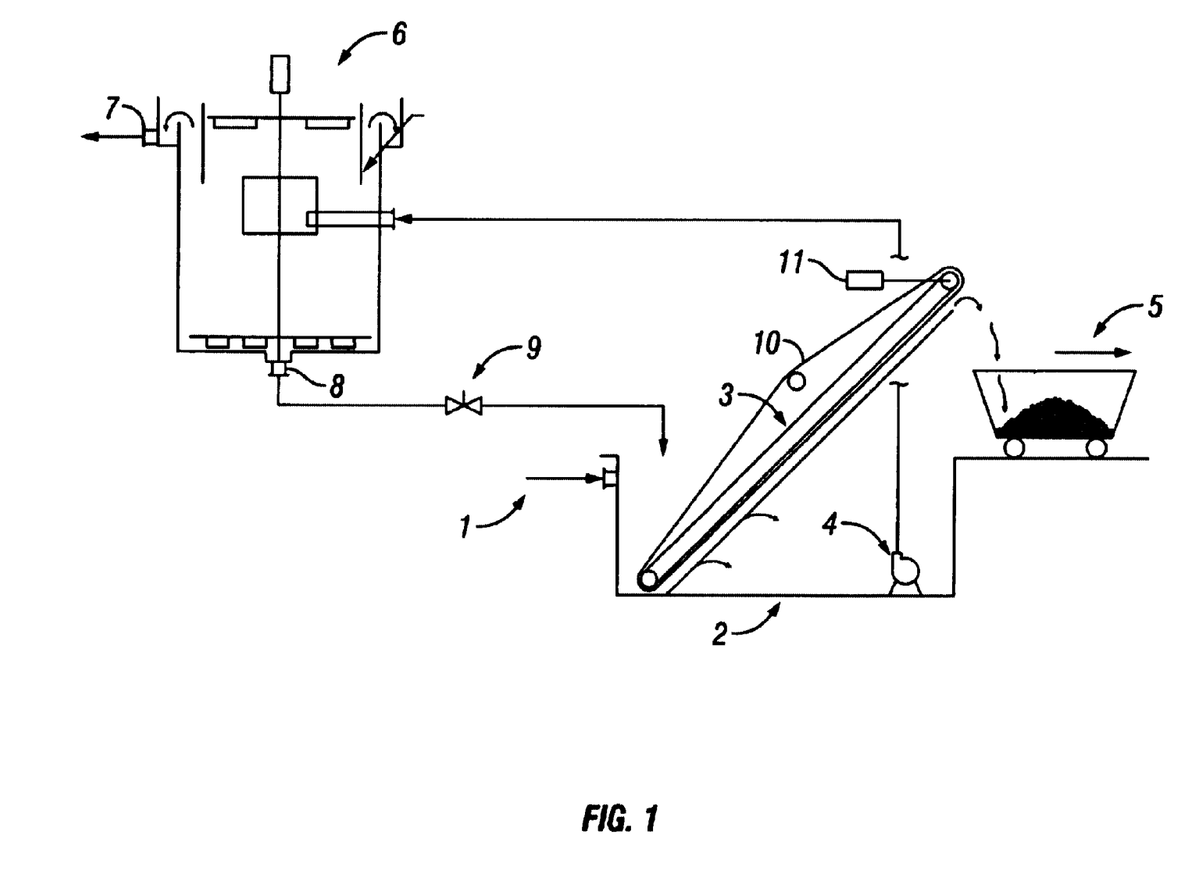
FIG. 1 is an illustration of an embodiment of the present invention.

Now referring to FIG. 1, an illustration of an embodiment of the present invention, an apparatus for treatment of wastewater is disclosed. In this embodiment, the present invention comprises a wastewater source 1, a grade screen separation device 3, a pit 2, a hopper 5, and a clarifier 6. Wastewater is conveyed to a pit 2 with a grade screen separation device 3. The wastewater may come from any source. Examples of sources include, but are not limited to, livestock production facilities; such as cattle, swine, goat, sheep, horse and the like, chicken ranches, duck farms, geese farms, human waste, and the like. Pit 2 may be of any depth dependent on several factors, including, but not limited to, the volume of wastewater treated, the available space, the size of device 3, and the like. In fact, various embodiments do not use a pit 2, but rather, other suitable substitutes. Examples of suitable substitutes for pit 2 include bins, tanks, slopes, ponds, tables, and the like. Wastewater conveyed to pit 2 is screened to remove a portion of the solid material by grade separation device 3 such that a portion of a solid material is screened while a portion of the liquid material passes through the screen. Grade separation device 3 may be set in any orientation of inclination in relation to horizontal desired. In an embodiment, device 3 is horizontal. In other embodiments, device 3 is inclined or declined from horizontal. Further, device 3 may include a screen 10. Screen 10 may have holes or passages of varying size depending upon the size of solid material sought to be screened. Further, various embodiments may rotate screen 10 about a plane of orientation of device 3. In an embodiment, the screen is rotated about a portion of device 3 by pulleys and gears. In another embodiment, the screen is agitated or moved in alternating directions to sift solid material from the wastewater. The rotation, agitation, movement, locomotion and/or the like of screen 10 may be accomplished by a motor 11. However, any method or device common in the art may be used.

The solid material and/or particles collected on or about screen 10 may be conveyed out of pit 2 and off of device 3 into a trolley 5 or other device for collection. Once collected the solid material may be disposed of or used by any method common in the art. Screen 10 of device 3 may be of any size and/or the holes through screen 10 may be of any size. The more fine the screen holes are, or the smaller the holes in the screen, the more solid material that may be removed.

The liquid that is collected or left in pit 2 may then be conveyed to a clarifier 6. In an embodiment, the liquid conveyed is pumped into clarifier 6 by a pump 4. Various embodiments of the present invention utilize any variety of clarifier. In an embodiment, clarifier 6 is an elevated gravity flow clarifier. However, other embodiments use forced circulation and inclined clarifiers. Clarifier 6 acts further to remove solid and dissolved material from the wastewater.

In an embodiment, as the wastewater is clarified, a sludge collects about a portion of the clarifier. In one of the embodiments of this type, a sludge collects about the lower portion of the clarifier. The sludge may be drained or removed from clarifier 6 at a location 8. In various embodiments, the removed sludge may be conveyed back to pit 2 for further separation and disposal. In other embodiments, the sludge is used for a further process. The flow of removed sludge from clarifier 6 may be controlled by a valve 9 to limit the amount of material withdrawn from clarifier 6 or to control or select the time and/or conditions when sludge is removed from clarifier 6.

Various embodiments of clarifier 6 may include portions, pieces and apparatuses that are common in the art for the treatment of a wastewater. One example of an appropriate clarifier is a Hoffland-Environmental circular up-flow clarifier. However, other clarifiers may be used and will be readily known and apparent in the art.

To facilitate the removal of sludge collected about portions of clarifier 6 a variety of sludge rakes may be used either in combination or alternatively. One such example of a sludge rake includes, but is not limited to, a Hoffland-Environmental sludge rake. Various other embodiments of clarifier 6 may utilize a top scum rake to collect solid material above the bottom of clarifier 6. One such example is, but is not limited to, the Hoffland-Environmental scum rake. However, various embodiments may not use a top or a bottom scum rake.

As wastewater is treated in clarifier 6 a portion of the solid material may be removed from the wastewater such that wastewater may be further cleaned and solid particle and dissolved particle content reduced. In an embodiment, clarified wastewater is allowed to exit clarifier 6 about an opening 7. The clarified wastewater allowed to exit may be conveyed to a lagoon, holding pond, facultative pond, or other structure for further use or disposal. Various methods of collection and removal of clarified wastewater from clarifier 6 may be used and are well known in the art. In an embodiment, a portion of the clarified wastewater removed is recycled for further use in the wastewater treatment process and/or facility. In another embodiment, the wastewater in the lagoon is used for fertilization.

The treatment of wastewater by these various processes and apparatuses will reduce the solids contained in the wastewater thereby reducing the BOD and COD of the wastewater and consequently reducing the amount of oxygen necessary to maintain aerobic processes. The maintenance of an aerobic treatment process will reduce unpleasant odors and toxicity and make the further use of the wastewater more practical for other operations including, but not limited to, fertilization and the like.

Figure 2:
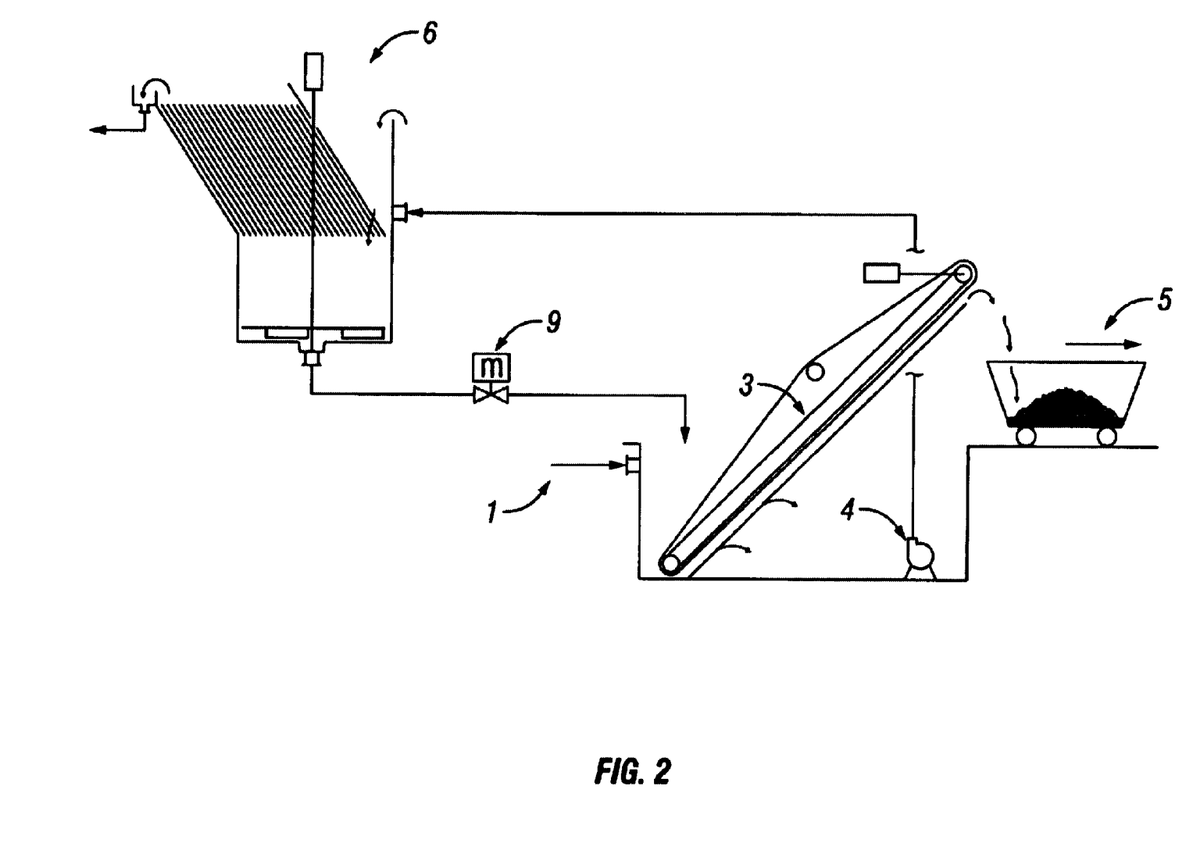
FIG. 2 is an illustration of an alternate embodiment of the present invention.

Now referring to FIG. 2, an alternate embodiment of the present invention is disclosed. Clarifier 6 is illustrated as an inclined plane clarifier. The inclined plane clarifier acts as a screen to separate additonal solid material from the wastewater. Such devices are known in the art. An inclined plane clarifier better maximizes setting area and minimizes the required floor space.

Figure 3:
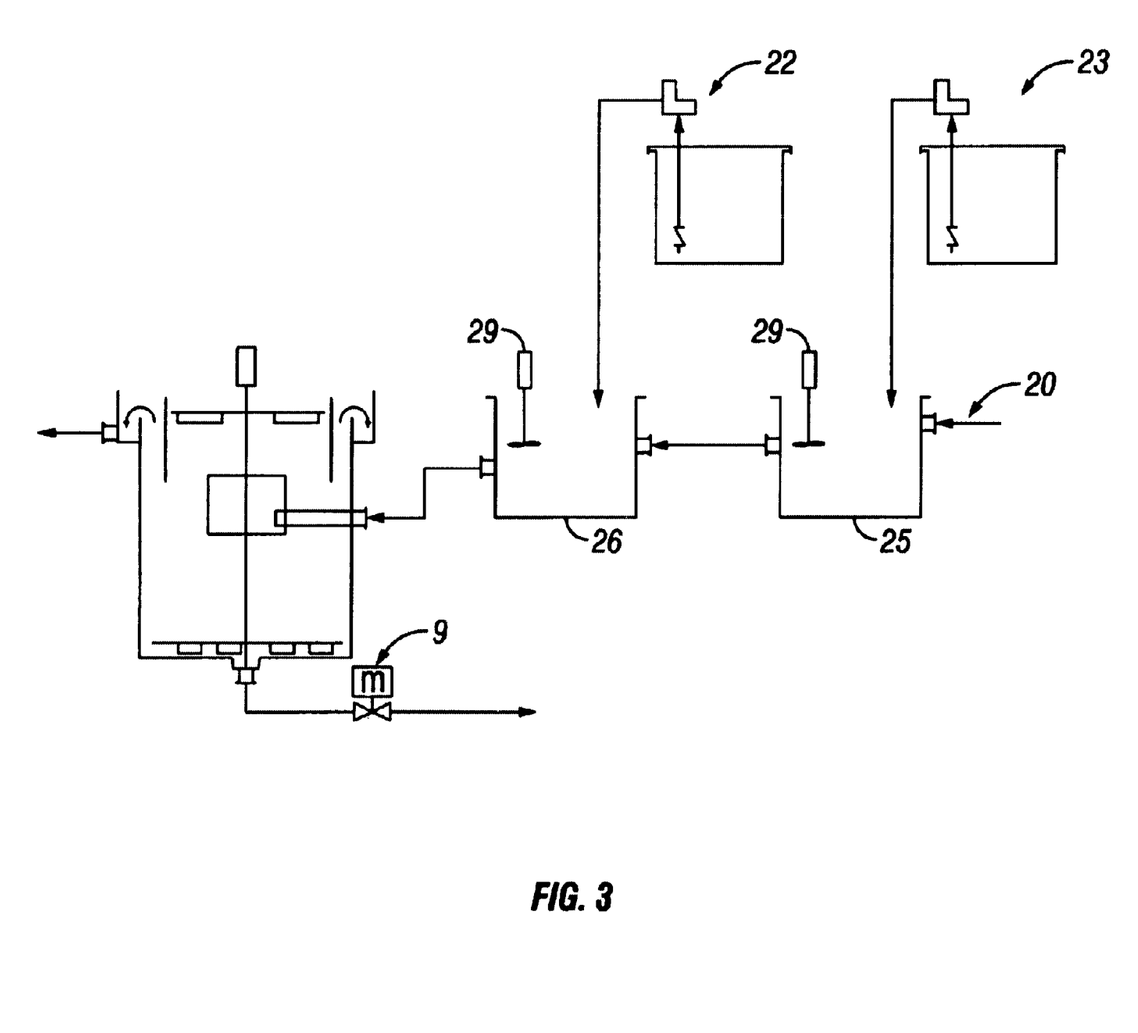
FIG. 3 is an illustration of an alternate embodiment of the present invention.

Now referring to FIG. 3, an alternate embodiment of the present invention, embodiments including chemical treatments of the wastewater are disclosed. Wastewater treated by various embodiments of the present invention may incorporate the addition of chemicals to aid in colloidal separation of the solids and dissolved solids, precipitation of dissolved solids, reduction of odor, conditioning, adjusting the pH, adjusting the electrolyte content, and the like of the wastewater. Various embodiments utilizing further chemical treatments may convey the wastewater along a path 20 into a tank 25. Tank 25 may include a mixer 29 or other device common in the art for circulating the wastewater. A treatment chemical may be added to tank 25 from a treatment chemical supply 23 or any other suitable source. Treatment chemical supply 23 may contain or comprise any chemical common in the art for treating wastewater, such as inorganic and organic conditioning agents and/or flocculating agents. Examples of such chemicals are common in the art and include, but are not limited to, aluminum chloride, ferric chloride, electrolytes, acids, bases, and the like. The use of such chemicals may improve the clarifier performance but are not required.

Various other embodiments of the present invention may utilize multiple treatments of wastewater with multiple chemicals in multiple tanks, such as tank 26 and chemical(s) 22. However, such other treatments are not required, but may be found to increase the waste removal from the wastewater. Such further chemical treatments may be employed in an environmentally sound manner such that the production of harmful products and is reduced.

Figure 4:
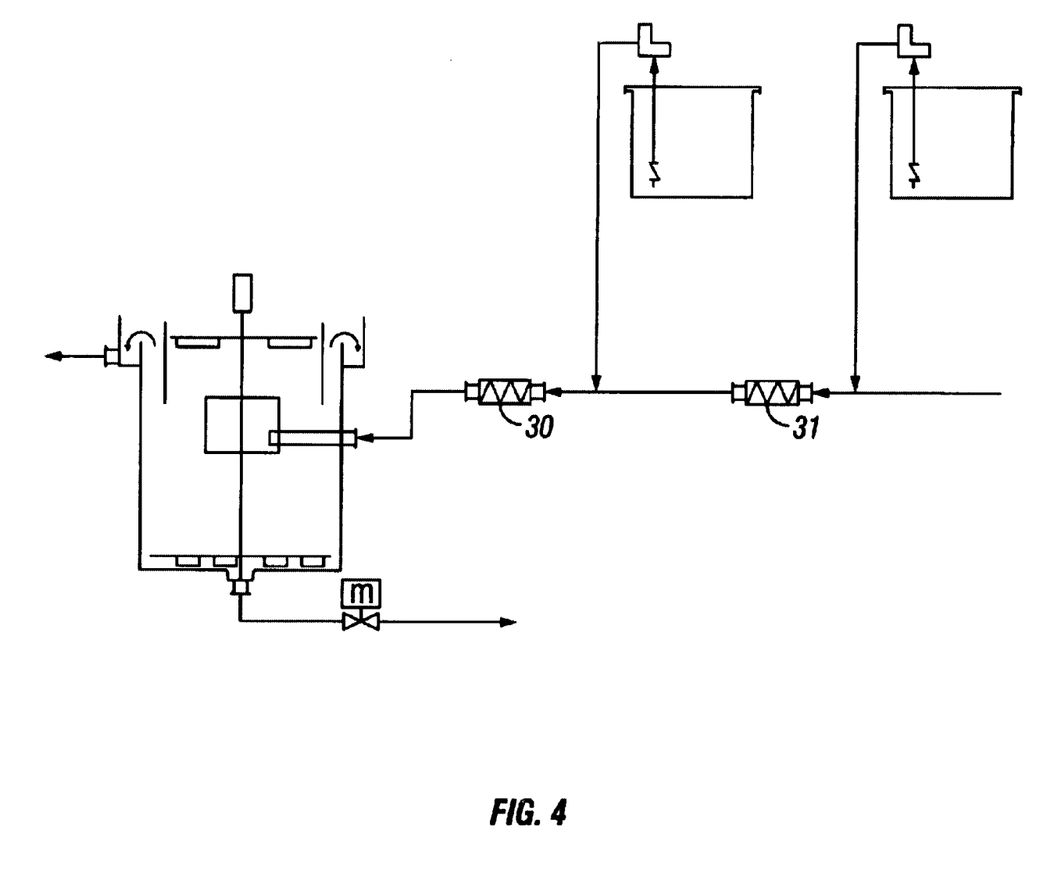
FIG. 4 is an illustration of an alternate embodiment of the present invention.

Now referring to FIG. 4, an illustration of an alternate embodiment, tanks for mixing of chemicals with the wastewater are not used. Mixing chamber 30 may be used to mix any utilized chemicals with the wastewater. Various embodiments may utilize any number of mixing chambers. In the illustrated embodiment, two mixing chambers 30 and 31 are connected in series. However, various other embodiments may utilize other combinations of mixing chambers in a variety of configurations including parallel and series configurations depending upon the application.

Figure 5:
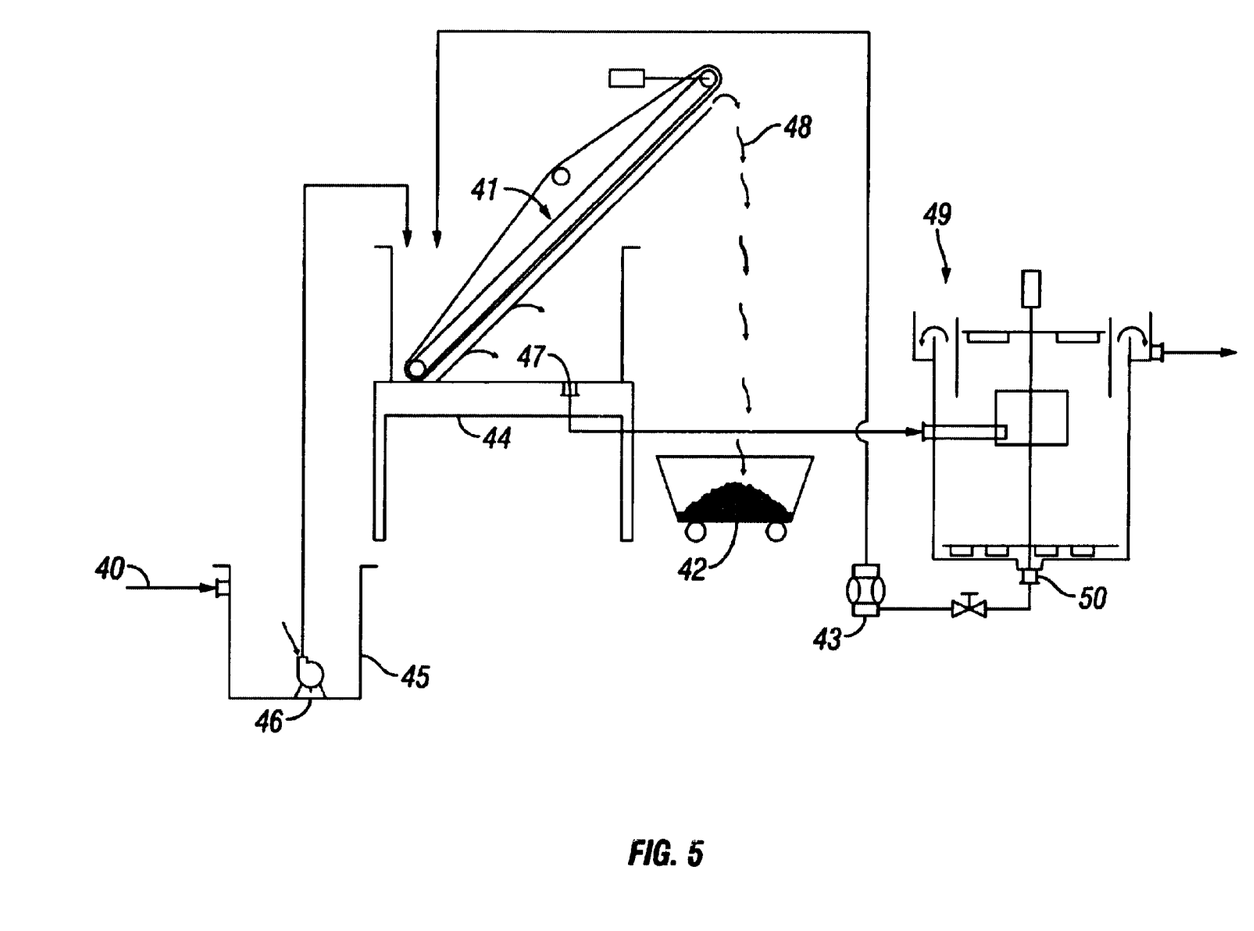
FIG. 5 is an illustration of an alternate embodiment of the present invention.

Now referring to FIG. 5, an alternate embodiment of the present invention, an embodiment is illustrated where the wastewater is pretreated before separation of the solids and dissolved solids. In an embodiment, wastewater is conveyed along a line or path 40 from a source, as heretofore described, into a tank 45. The wastewater may be treated for any desired effect or condition. In another embodiment, no pretreatment is performed and tank 45 may be a holding tank. After the wastewater is conveyed into tank 45 the wastewater is pumped by pump 46 or other similar methods or apparatuses into a tank 44. Tank 44 may have a separator screen device 41. As the wastewater is screened on separator screen device 41, a portion of the solid material in the wastewater will be conveyed along device 41 and conveyed to a trolley 42 for disposal or further use. The liquid and solid matter remaining in tank 44 may be passed at an opening 47 to a clarifier 49 where the wastewater will have further solid and dissolved solid matter removed. As described before, the sludge collected along a portion of tank 49 may be passed at a location 50. In embodiments of this design, after the sludge is passed from tank 49 it may be pumped back into tank 44 to be removed about device 41. Other embodiments of this type may convey the sludge elsewhere for any use or purpose.

Figure 6:
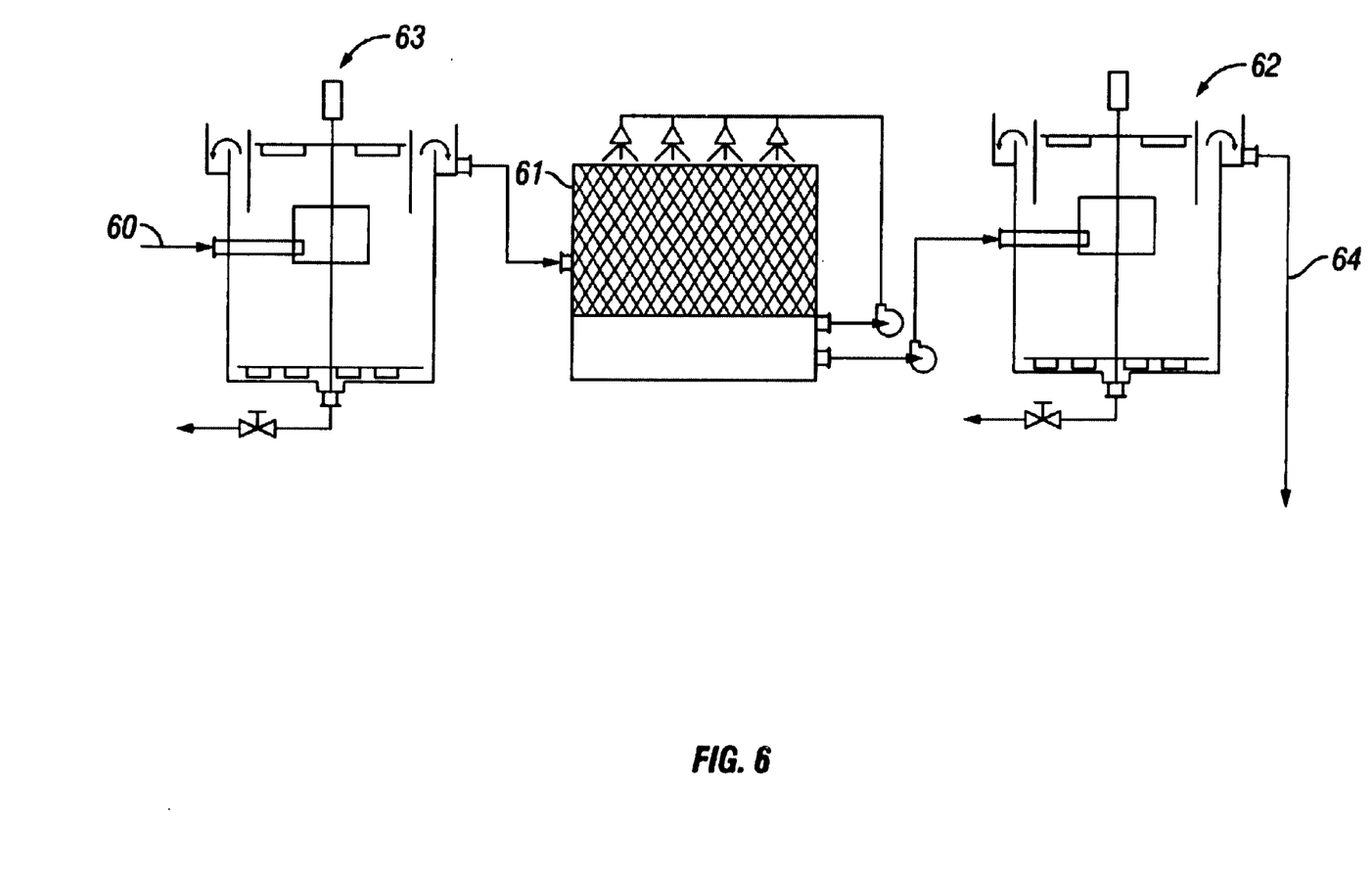
FIG. 6 is an illustration of an alternate embodiment of the present invention.

Now referring to FIG. 6, an alternate embodiment of the present invention, another embodiment of a clarifier system is disclosed. After the wastewater is screened, it may be conveyed along a path 60 to a clarifier 63. The clarified wastewater may then be passed into a bio-tower 61. For example, a Hoffland-Environmental Bio-tower. The bio-tower 61 acts as a trickling filter. Bio-tower 61 has a naturally occurring biomass culture adhering to walls within the tower. Convection of air about bio-tower 61 supports an aerobic culture and/or aerobic biological activity. As wastewater flows through the biomass, or media, a portion of soluble organic material in the wastewater is consumed. A second clarifier 62 may be used following bio-tower 61 for further clarification of wastewater. Other embodiments of this type utilize bio-tower 61 and clarifier 63 in alternate orders and in varying numbers.

Figure 7:
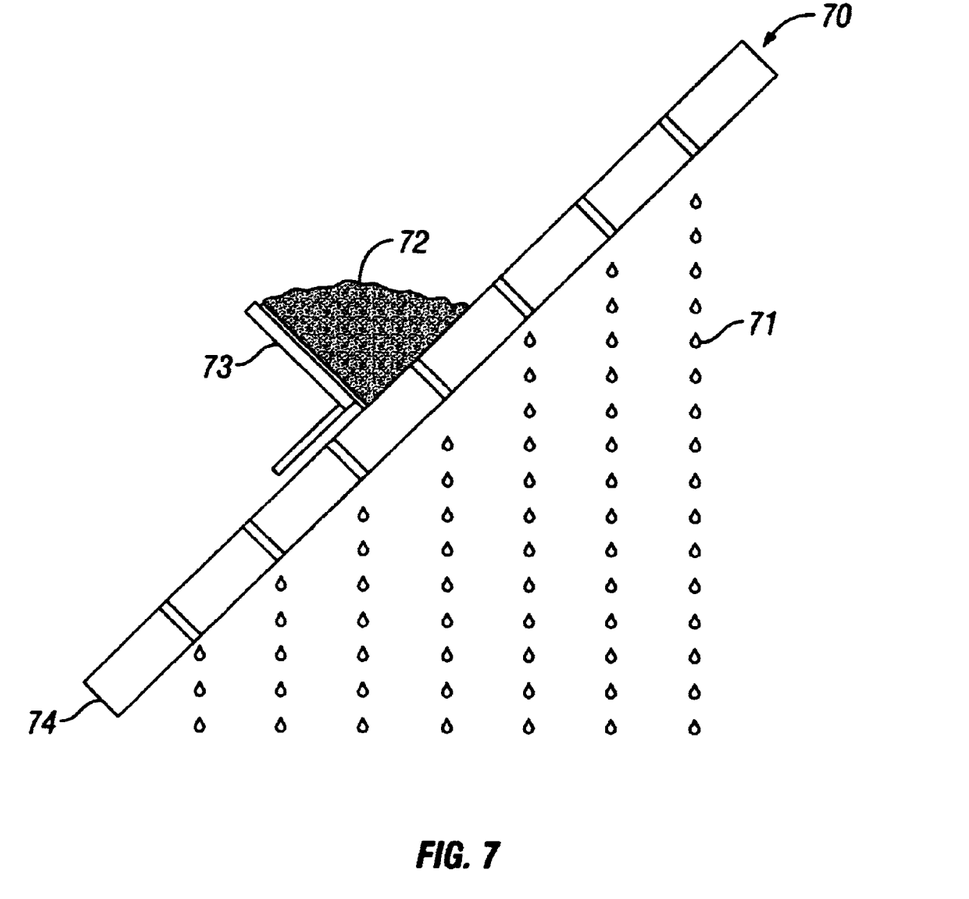
FIG. 7 is an illustration of a separator screen device of the present invention.

Now referring to FIG. 7, an alternate embodiment of a separator screen device is disclosed. Separator screen device 70 may generally be composed of a plane 74 and a drag chain 73. Waste solid particles 72 collected on a surface of plane 74 may be conveyed along plane 74 by a drag chain 73. A portion of a surface of plane 74 is porous such that liquid collected on a surface of plane 74 may pass through fall below. In an embodiment, a portion of the upper surface of plane 74 is porous. In another embodiment, the portion porous is the entire surface of plane 74. However, various other embodiments may utilize different structures to convey solid particles along plane 74 and will be readily apparent to those of ordinary skill in the art.

Figure 8:
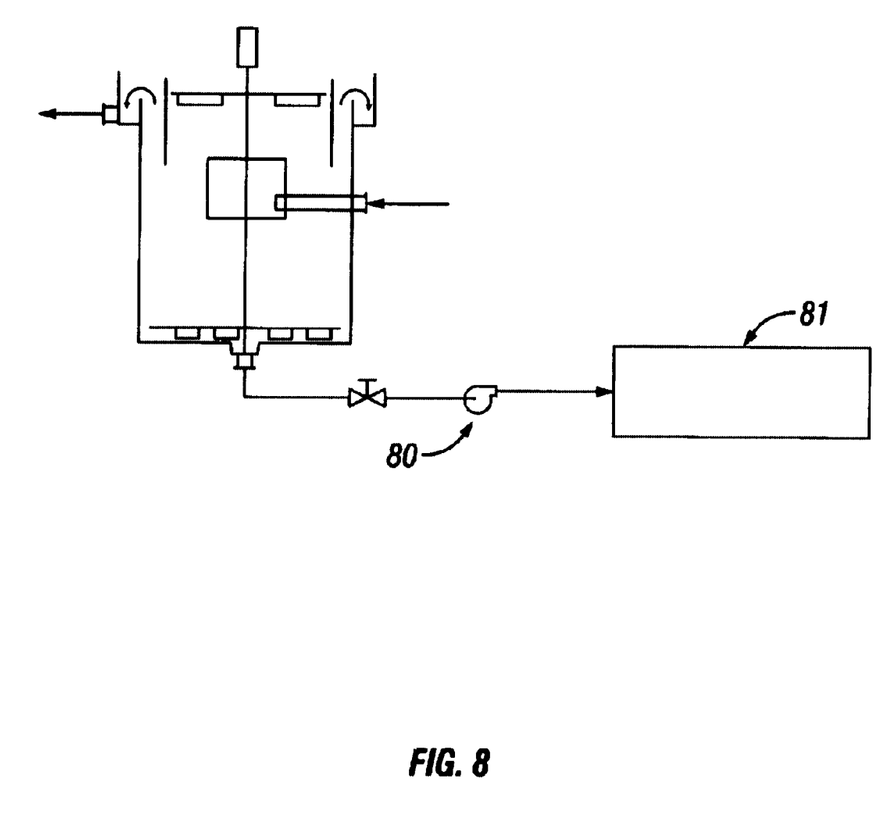
FIG. 8 is an illustration of an alternate embodiment of the present invention.

Now referring to FIG. 8, an alternate embodiment of the present invention is disclosed. Sludge collected from a portion of a clarifier may be conveyed and pumped by pump 80 into a solid compaction unit 81 for disposal or further use. Various other embodiments may compact the waste solids and sludge without the use of a pump.

Figure 9:
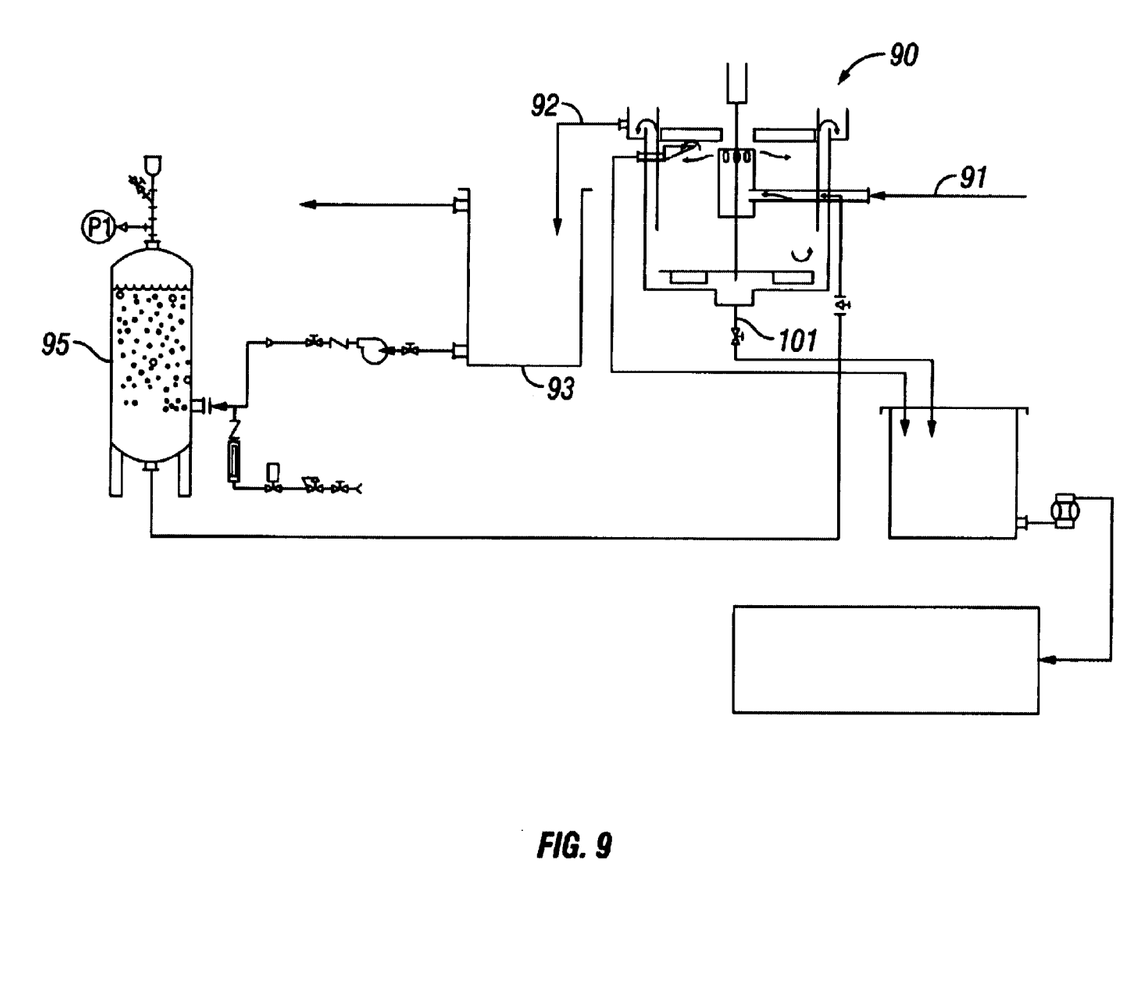
FIG. 9 is an illustration of an alternate embodiment of the present invention.

Now referring to FIG. 9, an alternate embodiment of the present invention is disclosed. FIG. 9 illustrates a gravity clarifier 90, tank 93, and dissolved air flotation system 95. In this embodiment, wastewater is conveyed through a port 91 into a gravity clarifier. A second solid material may be removed from about a portion of clarifier 90 at opening 101 and a portion of the wastewater will be conveyed along path 92 into tank 93. A portion of the wastewater conveyed into tank 93 will still have a portion of solids. The portion of solids in tank 93 is passed to a dissolved air flotation system for additional solid removal, while a portion of the wastewater in tank 93 will be conveyed to a lagoon or facultative pond. The wastewater in system 95 will be further separated, as is known in the art. Solid portions separated by system 95 may be conveyed to a trolley or disposed of in another manner. Liquid portions separated by system 95 may be conveyed back into a clarifier, screen, or facultative pond. However, various other arrangements and modifications incorporating the use of a dissolved air flotation system will readily apparent to those of ordinary skill in the art.

Figure 10:
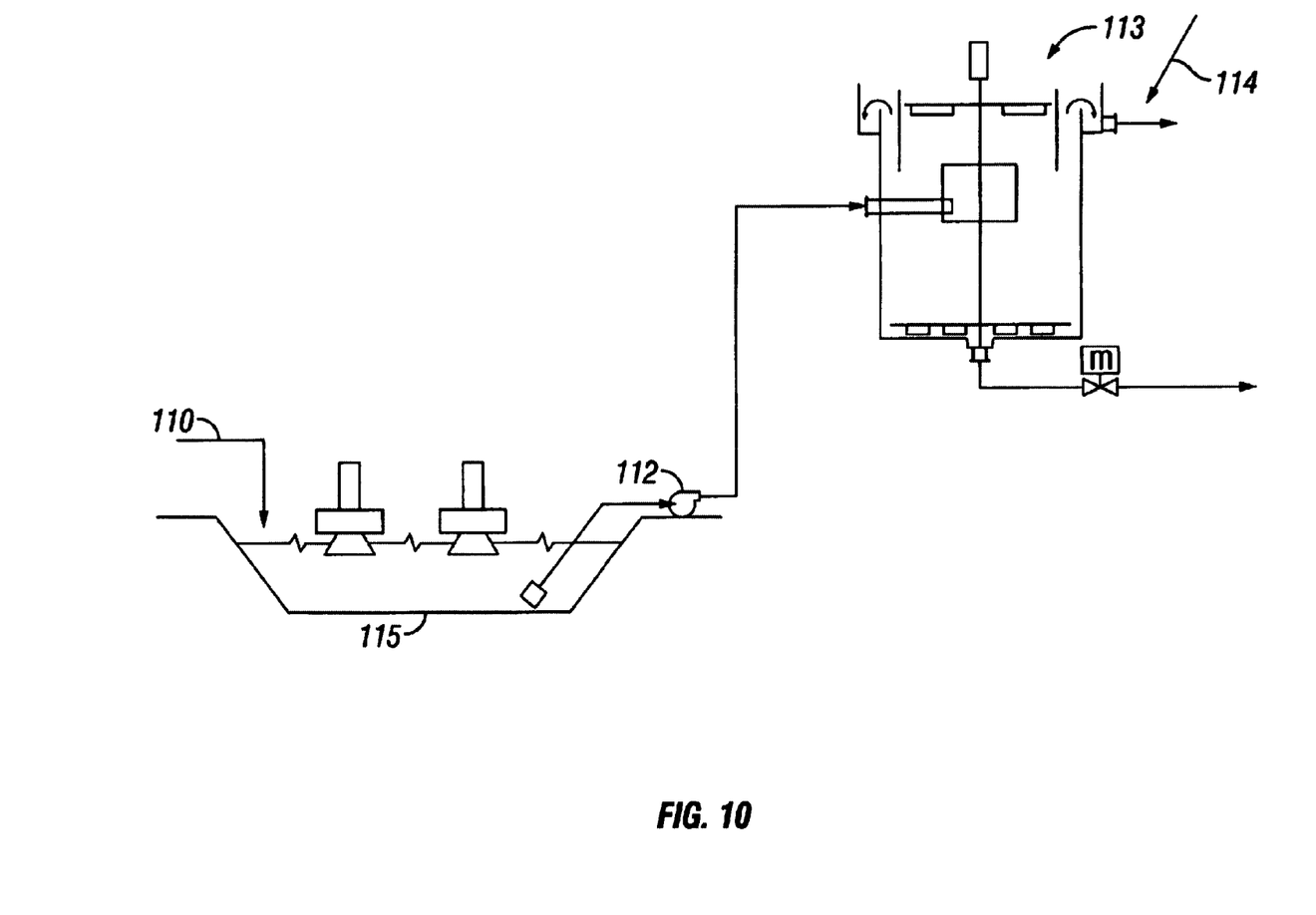
FIG. 10 is an illustration an embodiment of a denitrification system in use with embodiments of the present invention.

Now referring to FIG. 10, an embodiment of a de-nitrification system in use with embodiments of the present invention is disclosed. In addition to the various embodiments described above, wastewater may be further cleaned by de-nitrification. In an embodiment, wastewater from a clarifier or other treatment facility device and/or apparatus is conveyed along a path 110 to a tank 115. Tank 115 is equipped with at least one aeration system, constructed and fit in tank 115 as is common in the art. The aeration of tank 115 and wastewater will act to further decrease the amount of nitrogen present in the wastewater. The at least partially denitrified wastewater is then pumped, by pump 112 or similar device, to a clarifier 113. A clarified wastewater may be withdrawn about location 114 for further use or disposal.

The various embodiments herein described may be combined, separated and rearranged to provide a system suitable for a particular use and no one embodiment herein described shall be limited by its arrangement.

In addition to apparatuses for the treatment of wastewater, the present invention envisions a method for treating wastewater. Such method generally comprises a process involving the aforementioned embodiments. Generally, such processes comprise the steps of obtaining a wastewater, screening the wastewater to remove solid particles, and clarifying the wastewater to produce a treated wastewater. The method may be modified by the addition of pretreating, further screening, clarifying, bio-tower treatment, chemical treating, and/or alternate arrangement of the steps.

It will be understood that the embodiments described above are capable of many modifications and alterations while still keeping within the scope and bounds of the Description, the description herein given is only for illustrative purposes and not intended to limit the present invention. It further will be understood by those skilled in the art that movement, passing, or pumping of wastewater through the treatment modalities of the present invention may be accomplished by any suitable method and/or device such as gravity flow or pumping and that terms to describe such movement herein are for illustrative purposes only and not intended to limit the present invention.

What is claimed is:

1. A method for treating wastewater comprising the steps of:
   providing a source of wastewater contaminated with a solid material;
   providing a screen in the wastewater flow path;
   screening the wastewater to remove a first portion of the solids, wherein the screen dewaters the solid material retained by the screen;
   moving the screened wastewater to a clarifier;
   classifying the wastewater to settle a second portion of solids at the bottom of said clarifier; and
   moving said second portion of the settled solids to said screen which further removes and dewaters a portion of the solid material from the wastewater.

2. The method of claim 1 wherein the step of screening the wastewater and dewatering the solid material is performed at least partially with at least one elevated screen separation device.

3. The method of claim 2 wherein the screen separation device is at an angle of inclination from horizontal.

4. The method of claim 1 further comprising the step of treating the wastewater with at least one chemical.

5. The method of claim 1 further comprising the step of treating the wastewater with at least one chemical prior to said screening of the wastewater.

6. A method for the treatment of wastewater to prevent an anaerobic lagoon by reducing solids in wastewater comprising the steps of:
   providing a lagoon;
   providing a source of wastewater contaminated with a solid material;
   providing a screen in the wastewater flow path;
   screening the wastewater to remove a first portion of the solids, wherein the screen dewaters the solid material retained by the screen;
   moving the screened wastewater to a clarifier;
   classifying the wastewater to settle a second portion of solids at the bottom of said clarifier; and
   moving said second portion of settled solids to said screen which screens the wastewater contaminated with a solid material.

7. The method of claim 6 further comprising conveying the wastewater to at least one lagoon.

8. The method of claim 6 wherein the lagoon is aerated.

9. The method of claim 6 further comprising the step of treating the wastewater with at least one chemical.

10. The method of claim 6 further comprising the step of treating the wastewater with at least one chemical prior to said screening of the wastewater.

11. An apparatus for the treatment of wastewater comprising:
    at least one elevated screen separation device downstream from a wastewater source capable of separating and dewatering a first solid material from said wastewater;
    a clarifier system with at least one clarifier connected downstream of the elevated screen separation device capable of removing a second solid material from the wastewater; and
    means to convey said second solid material to said at least one elevated screen.

12. The system of claim 11 further comprising at least one trolley for collecting the screened portion of the solid material retained by the screen.

13. An apparatus for the treatment of wastewater comprising:
    at least one screen separation device downstream from a wastewater source capable of separating and dewatering a first solid material from said wastewater;
    a clarifier system with at least one clarifier connected downstream of the screen separation device capable of removing a second solid material from the wastewater; and
    means to convey said second solid material to said at least one screen.

14. The system of claim 13 further comprising at least one trolley for collecting the screened portion of the solid material retained by the screen.

* * * * *